(12) United States Patent
Rutan

(10) Patent No.: US 8,960,590 B2
(45) Date of Patent: Feb. 24, 2015

(54) PRESSURE-EQUALIZING CRADLE FOR BOOSTER ROCKET MOUNTING

(71) Applicant: Elbert L. Rutan, Coeur d'Alene, ID (US)

(72) Inventor: Elbert L. Rutan, Coeur d'Alene, ID (US)

( * ) Notice: Subject to any disclaimer, the term of this patent is extended or adjusted under 35 U.S.C. 154(b) by 0 days.

(21) Appl. No.: 13/944,971

(22) Filed: Jul. 18, 2013

(65) Prior Publication Data
US 2015/0021428 A1 Jan. 22, 2015

(51) Int. Cl.
*B65D 3/00* (2006.01)
*B64G 1/00* (2006.01)

(52) U.S. Cl.
CPC ........................... *B64G 1/005* (2013.01)
USPC ........................................ 244/1 TD

(58) Field of Classification Search
USPC .............. 244/1 TD, 2, 3, 171.4, 173.1, 173.3; 89/1.8, 1.819, 1.801
See application file for complete search history.

(56) References Cited

U.S. PATENT DOCUMENTS

| | | | |
|---|---|---|---|
| 4,043,524 A | 8/1977 | Dreyer et al. | |
| 4,614,320 A | 9/1986 | Rutan | |
| 4,641,800 A | 2/1987 | Rutan | |
| D292,393 S | 10/1987 | Rutan | |
| 5,395,073 A | 3/1995 | Rutan et al. | |
| 5,564,648 A * | 10/1996 | Palmer | 244/2 |
| 5,626,310 A | 5/1997 | Kelly | |
| 5,769,359 A | 6/1998 | Rutan et al. | |
| 5,975,464 A | 11/1999 | Rutan | |
| 6,029,928 A | 2/2000 | Kelly | |
| 6,089,504 A | 7/2000 | Williams et al. | |
| 6,276,866 B1 | 8/2001 | Rutan | |
| 6,913,224 B2 * | 7/2005 | Johansen | 244/3 |
| 7,195,207 B2 | 3/2007 | Rutan | |
| 7,472,866 B2 * | 1/2009 | Heaston et al. | 244/63 |
| 7,523,892 B2 | 4/2009 | Cook | |

(Continued)

FOREIGN PATENT DOCUMENTS

EP 0680436 B1 11/1998
EP 0793599 A4 4/1999

(Continued)

OTHER PUBLICATIONS

U.S. Appl. No. 13/914,744, filed Jun. 11, 2013, Rutan.

*Primary Examiner* — Brian M O'Hara
*Assistant Examiner* — Jessica Wong
(74) *Attorney, Agent, or Firm* — Mitch Harris, Atty at Law, LLC; Andrew M. Harris

(57) ABSTRACT

A launch system and method improve the launch efficiency of a booster rocket and payload. A launch aircraft atop which the booster rocket is mounted in a cradle, is flown or towed to an elevation at which the booster rocket is released. The cradle provides for reduced structural requirements for the booster rocket by including a compressible layer, that may be provided by a plurality of gas or liquid-filled flexible chambers. The compressible layer contacts the booster rocket along most of the length of the booster rocket to distribute applied pressure, nearly eliminating bending loads. Distributing the pressure eliminates point loading conditions and bending moments that would otherwise be generated in the booster rocket structure during carrying. The chambers may be balloons distributed in rows and columns within the cradle or cylindrical chambers extending along a length of the cradle. The cradle may include a manifold communicating gas between chambers.

18 Claims, 7 Drawing Sheets

(56) References Cited

U.S. PATENT DOCUMENTS 7,540,145 B2    6/2009   Rutan
8,262,015 B2 *  9/2012   Kuroda et al. .................... 244/3
8,308,142 B1    11/2012  Olson
8,540,183 B2 *  9/2013   Morris et al. ............... 244/1 TD

FOREIGN PATENT DOCUMENTS

| EP | 1608555 B1 | 3/2008 |
| EP | 1608863 B1 | 6/2012 |
| EP | 2279945 A3 | 1/2013 |

* cited by examiner

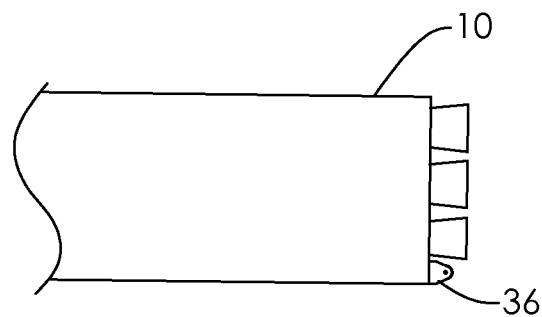
Fig. 7A
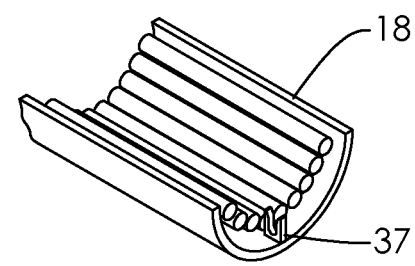
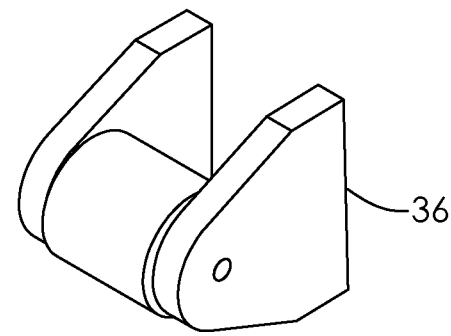
Fig. 7B
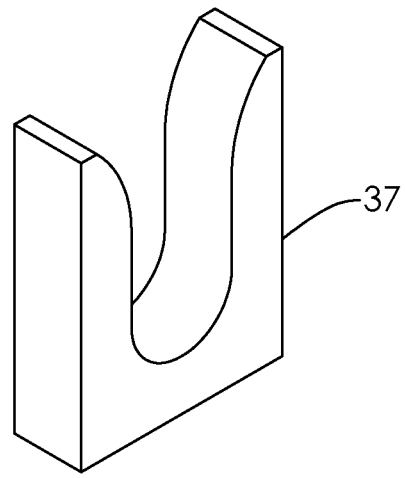

PRESSURE-EQUALIZING CRADLE FOR BOOSTER ROCKET MOUNTING

This invention was made with government support under NND12AB91Z awarded by the National Aeronautics and Space Administration (NASA) Dryden Flight Research Center. The government has certain rights to this invention.

BACKGROUND OF THE INVENTION

1. Field of the Invention

The present invention relates generally to orbital launch systems, and more particularly to a cradle design for mounting a booster rocket above a launch aircraft including towed launch aircraft.

2. Description of the Related Art

In order to remove launch constraints and to attempt to reduce the size and cost of booster rockets used in ground-based launches, aircraft have been used to carry booster rockets and attached payload to elevations near typical aircraft ceilings before the booster rocket is ignited. More recently, techniques have been developed using a tow aircraft to tow a towed launch glider. Such techniques improve launch efficiency, i.e., the ratio of the mass of the payload that reaches orbit to the total pre-launch mass of the booster rocket with payload, by carrying the booster rocket to a greater launch elevation.

When carrying the booster rocket, which has been supported under the launch aircraft by multiple releasable hooks that connect to points within the structure of the booster rocket, it has generally been necessary to reinforce the booster rocket structure far beyond what is required for the typical vertical launch configurations, in which the only bending loads are caused by ground-level winds before launch and wind shear during flight. The vertical and side loading imposed on the carrying aircraft by the loading of the booster rocket and payload are transferred to the booster rocket at the points of connection. Further, when the booster rocket is released, the separation itself, along with aerodynamic loading cause bending moments. Therefore, the booster rocket must be additionally reinforced so the few discrete highly-loaded attachments securing the booster rocket near its center-of-gravity that are used to carry the booster rocket are suitably supported, and so that bending moments do not exceed the elastic strength of the internal structure of the booster rocket. The result is increased weight and cost of the booster rocket, and a consequent reduction in launch efficiency.

Therefore, it would be desirable to provide an improved method and system for carrying a booster rocket and payload on a launch aircraft.

SUMMARY OF THE INVENTION

The above objectives and others are achieved in a method and system for carrying a booster rocket and payload.

The method and system provide a cradle for supporting the weight of a booster rocket that may be used to launch a payload into orbit above a body, such as earth. The method is a method of carrying the booster rocket using the cradle. The system includes a launch aircraft atop which the cradle is mounted. The launch aircraft may be a towed glider or a powered aircraft, which may be towed or self-propelled. The cradle includes a compressible layer, which may be formed by a plurality of compressible gas or liquid-filled flexible chambers that contact the booster rocket over most of its length. The chambers act to equalize the pressure applied to surfaces of the booster rocket when the booster rocket is mounted in the cradle. The plurality of gas or liquid-filled chambers may be balloons disposed in rows and columns, or cylindrical chambers extending along a length of the cradle in the direction of a fuselage of the launch aircraft. A manifold may be included within the cradle for providing communication between the plurality of gas or liquid-filled chambers to equalize their internal pressure.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIGS. 7A-7B isometric views showing details of longitudinal support 37 of cradle 18 and a longitudinal restraint 36 on booster rocket 10.

DESCRIPTION OF ILLUSTRATIVE EMBODIMENT

The present invention encompasses methods and systems that improve a launch efficiency of orbital launches by reducing a weight and cost of a booster rocket used to launch a payload. The reduction in weight and cost is over that of a booster rocket that would otherwise be structurally reinforced to handle the high bending loads imposed by carrying the booster rocket under a launch aircraft. The present invention reduces the point loads and bending stresses imposed on the booster rocket during carrying to near-zero by providing a cradle atop the launch aircraft that has a compressible layer that contacts the booster rocket along most of the length of the booster rocket to support the booster rocket atop the launch aircraft. Related U.S. patent application Ser. No. 13/914,744 entitled "DYNAMIC TOW MANEUVER ORBITAL LAUNCH TECHNIQUE", by the inventor of the present application, discloses launch systems in which the booster rocket is carried atop the launch vehicle, and which may include a cradle as disclosed herein for supporting the booster rocket. The disclosure of the above-referenced U.S. Patent Application is incorporated herein by reference.

Figure 1A:
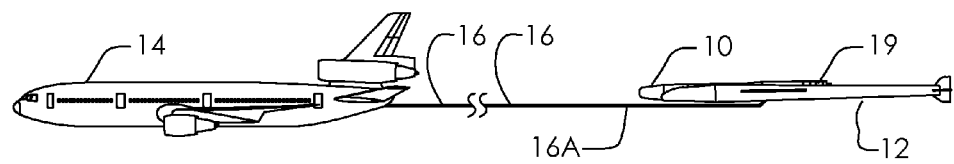
FIG. 1A is a side view and FIG. 1B is a top view of a towed launch arrangement in an exemplary orbital launch system.
Figure 1B:
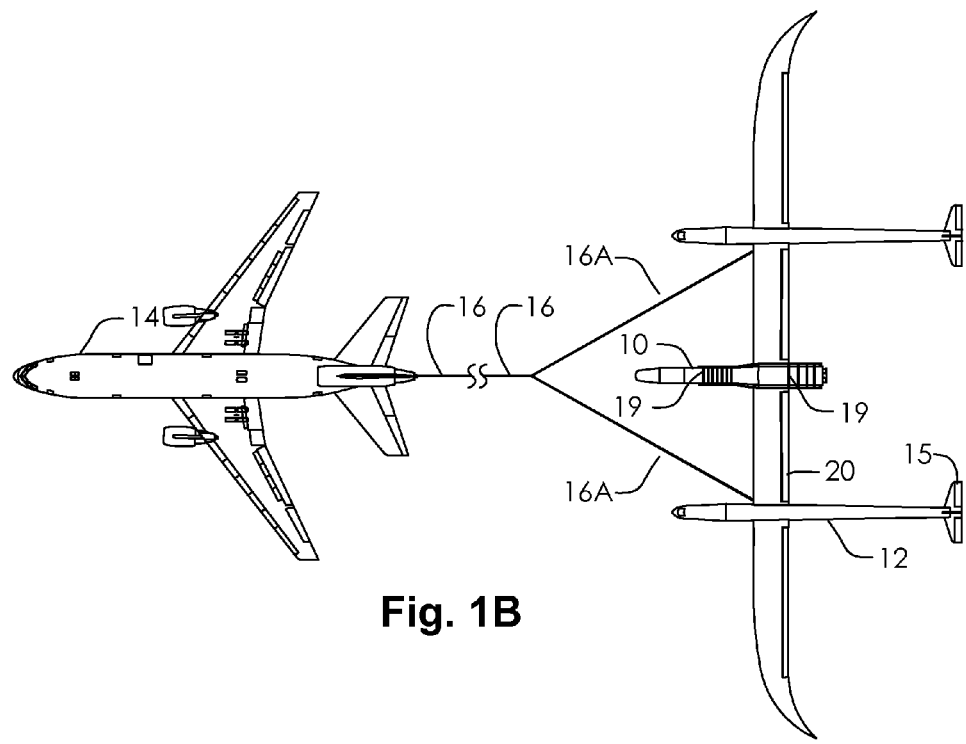

Referring now to FIGS. 1A-1B, a launch system is shown in side view and top view, respectively. A towing aircraft 14 is connected via a tow line, i.e. a tow line 16, to towed launch aircraft 12, atop which booster rocket 10 containing, or attached to a payload, is mounted. In the example, straps 19 are used to releasably secure booster rocket 10 atop a cradle of towed launch aircraft 12. Additional latches may also be used to secure booster rocket 10. Tow line 16 is approximately 25 times the length of towing aircraft 14 (e.g., 3500 feet for a 140 foot long towing aircraft 14), so in most of the Figures, tow line 16 is shown with a break for purposes of illustration. Tow line 16 is configured with split bridle sections 16A that eliminate interference with booster rocket 10 that otherwise might occur with a single cable connection. Bridle sections are generally attached to near the longitudinal center of gravity of towed launch aircraft 12 to prevent towed launch aircraft 12 from changing pitch under large tow line tensions. Towed launch aircraft 12 may be a glider, or may be a powered aircraft, which can simplify landing and subsequent re-use of towed launch aircraft 12. Towing aircraft 14, may for example be a DC-10 (DC-10 is a trademark of McDonnell Douglas Corporation) and tow line 16 may be a VECTRAN cable (VECTRAN is a trademark of Kuraray Co., Ltd. Corporation). A maneuver as described in the above-incorporated U.S. Patent Application generally initiated by manipulating elevators 15 of towed launch aircraft 12 to increase the lift of towed launch aircraft 12 for a predetermined period of time, until a particular flight path angle is reached. Separation of towed launch aircraft 12 from booster rocket 10 is generally assisted by manipulating flaps 20 of towed launch aircraft to reverse the lift of towed launch aircraft 12 when booster rocket 10 has been released. A cradle, as described below, also assists in separation of booster rocket 10 from towed launch aircraft 12, by applying force against surfaces of booster rocket 10 so that when straps 19 are released, booster rocket 10 is moved away from towed launch aircraft 12.

Figure 2:
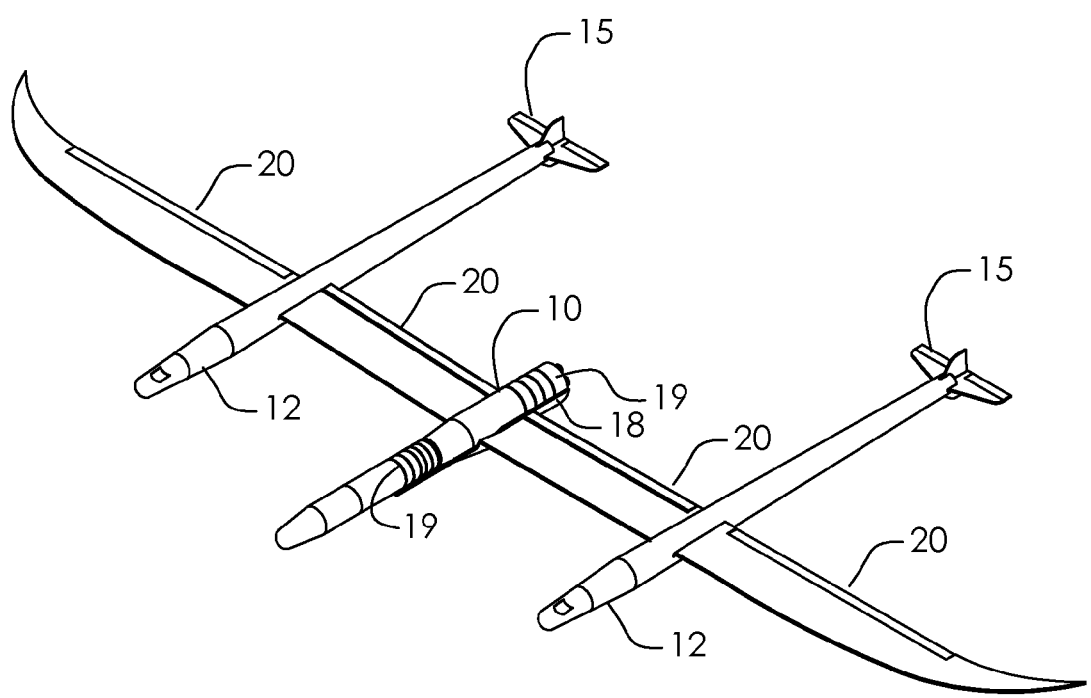
FIG. 2 is an isometric view of towed launch aircraft 12 of FIGS. 1A-1B with booster rocket 10 mounted in cradle 18.

Referring now to FIG. 2, further details of towed launch aircraft 12 are shown, including trailing edge flaps 20 that extend through almost the entire span of the wing of towed launch aircraft 12, which aids in reversing the lift of towed launch aircraft 12 to provide increased separation of booster rocket 10 in the maneuvers mentioned above. As described above, booster rocket 10 is secured in a cradle 18 formed above the wing of towed launch aircraft 12 by multiple straps 19 that are releasable, to permit separation of booster rocket 10 from towed launch aircraft 12.

Figure 3:
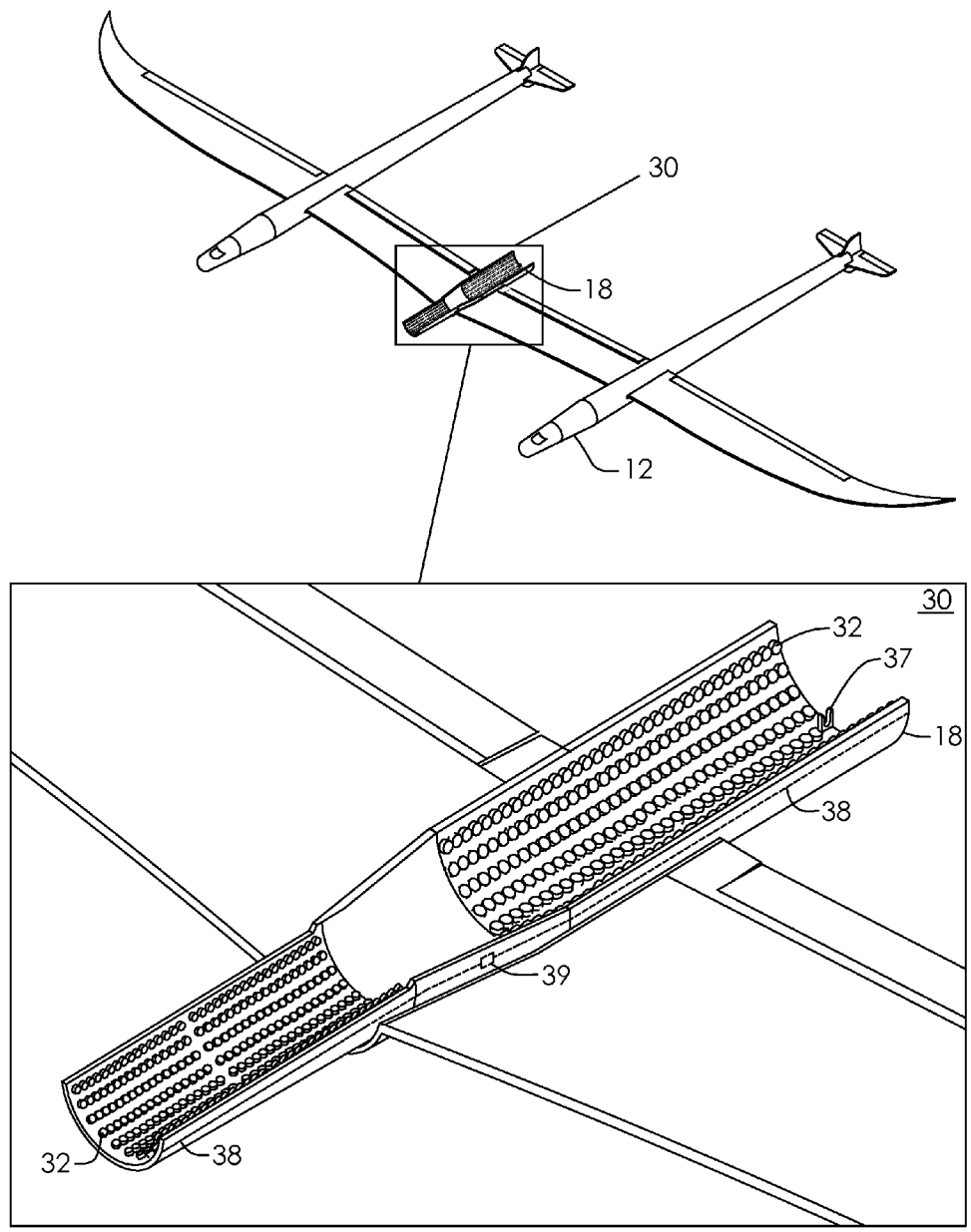
FIG. 3 is an isometric view of towed launch aircraft 12 of FIGS. 1A-1B showing details of cradle 18 in one example of the invention.

Referring now to FIG. 3, details of cradle 18 are shown. Within cradle 18, multiple balloons 32 are distributed to support booster rocket 10 and any attached payload, without causing substantial bending stress along the length of booster rocket 10 and eliminating large local loads on booster rocket 10 that would otherwise require additional reinforcement (and consequent increased weight) of booster rocket 10. By contacting the booster rocket along most of the length of booster rocket, rocket bending loads are nearly eliminated. A longitudinal support 37 affixed to cradle 18 to prevent longitudinal motion of booster rocket 10, while providing for vertical movement of the end of booster rocket 10 so that booster rocket 10 can float on balloons 32. While the illustrated cradle 18 includes gas-filled balloons 32 that are generally filled with air, liquid filled balloons may alternatively be used, or the inner compressible layer of cradle 18 might be provided by one or more solid layer sections formed from a solid material such as a rubber or foam. A callout 30 shows further detail. If a gas is used, a relief system must be provided to permit the gas to exit due to the elevation increase during flight, which will cause an atmospheric pressure reduction of approximately 12.7 psi in the transition from sea level to 40,000 ft. Therefore, if balloons 32 are inflated to 4 psi net surface pressure at sea level, for a total pressure of 14.7 psi+4 psi=18.7 psi, at an elevation of 40,000 feet, the total pressure must be reduced to 7 psi in order to maintain the same net surface pressure of 4 psi. (Net surface pressure refers to the pressure supporting the rocket via contact with balloons 32.) If provisions must be made for returning booster rocket 10 to the ground in an aborted launch scenario, balloons 32 must be re-pressurized during the descent in order to maintain the same net surface pressure. For both of the above purposes, in the illustrated example a piping system 38 that couples one or more rows of balloons is included and connected to a control system 39 that can pump gas out of piping to and from a storage tank within control system 39. While only one piping system 38 is shown for clarity, multiple piping systems are used to supply the multiple rows of balloons 32. Control system 39 will generally receive a signal from an altimeter, but may alternatively operate based on an a direct barometric measurement or other mechanism for determining the appropriate pressure within piping 38, which serves as manifolds connecting the balloons 32 in the corresponding row(s). In the example, two rows of balloons are connected per one piping system 38, so that if a leak or other failure occurs, the reduced contact with booster rocket 10 will not cause a failure of the entire launch and damage to booster rocket 10 and or launch aircraft 12. Balloons 32 can be fabricated using a thickness of approximately 0.020 inch and can be fabricated using ordinary latex rubber. The diameter of balloons 32 in the example is 6 inches. Balloons 32 may be connected via manifolds 38 to control and to equalize their internal pressure. Balloons 32 also aid in separation of booster rocket 10 when straps 19 are released. By providing balloons 32 rather than the typical discrete point supports employed by air launched vehicles, booster rocket 10 can be lighter and less costly, due to reduced structural requirements.

Figure 4:
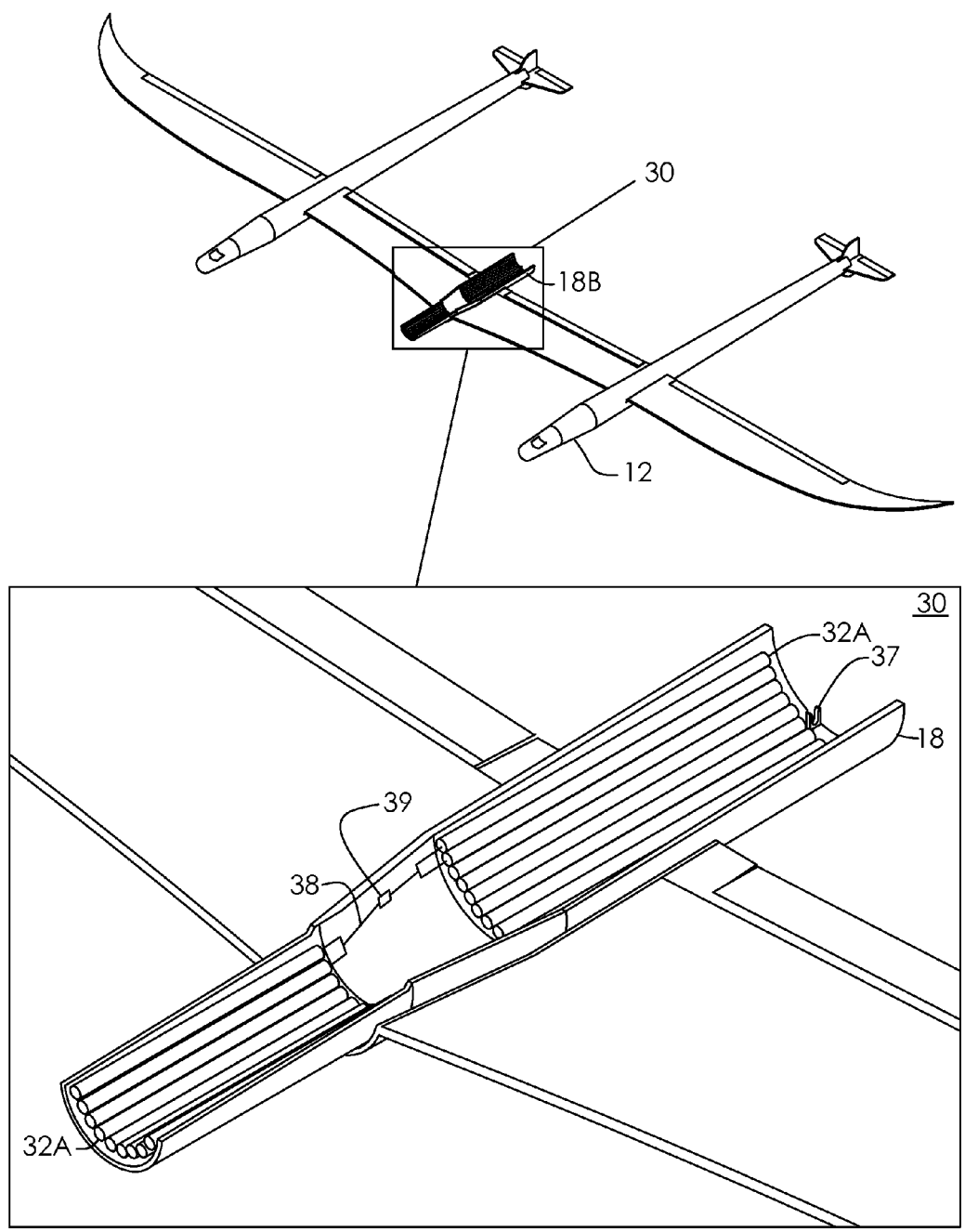
FIG. 4 is an isometric view of towed launch aircraft 12 of FIGS. 1A-1B showing details of cradle 18B in another example of the invention.

Referring now to FIG. 4, details of an alternative cradle design 18B are shown. Within cradle 18, multiple gas or liquid-filled cylinders 32A are distributed to support booster rocket 10 and any attached payload. As with cradle 18 of FIG. 3, piping systems 38 and control system 39 may be included to connect cylinders 32A to equalize their internal pressures, but since cylinders 32A will provide equalized support longitudinally along the length of booster rocket 10, equalization may not be needed between cylinders 32A.

Figure 5A:
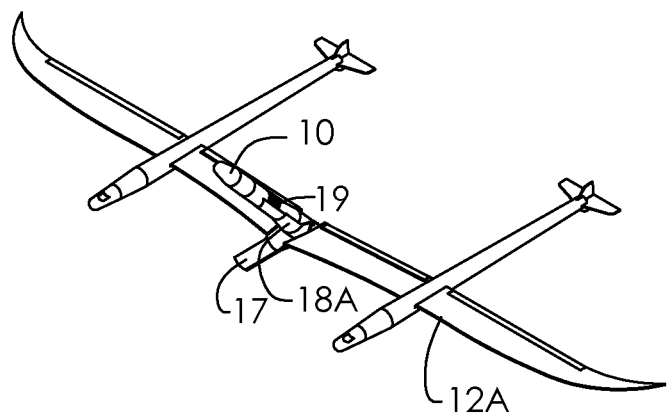
FIG. 5A and FIG. 5B are isometric views of an example of a towed launch aircraft 12A including a tilting cradle 18A.
Figure 5B:
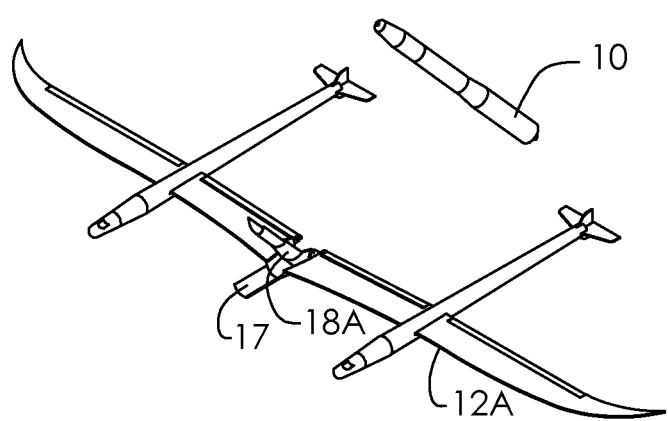
Figure 6:
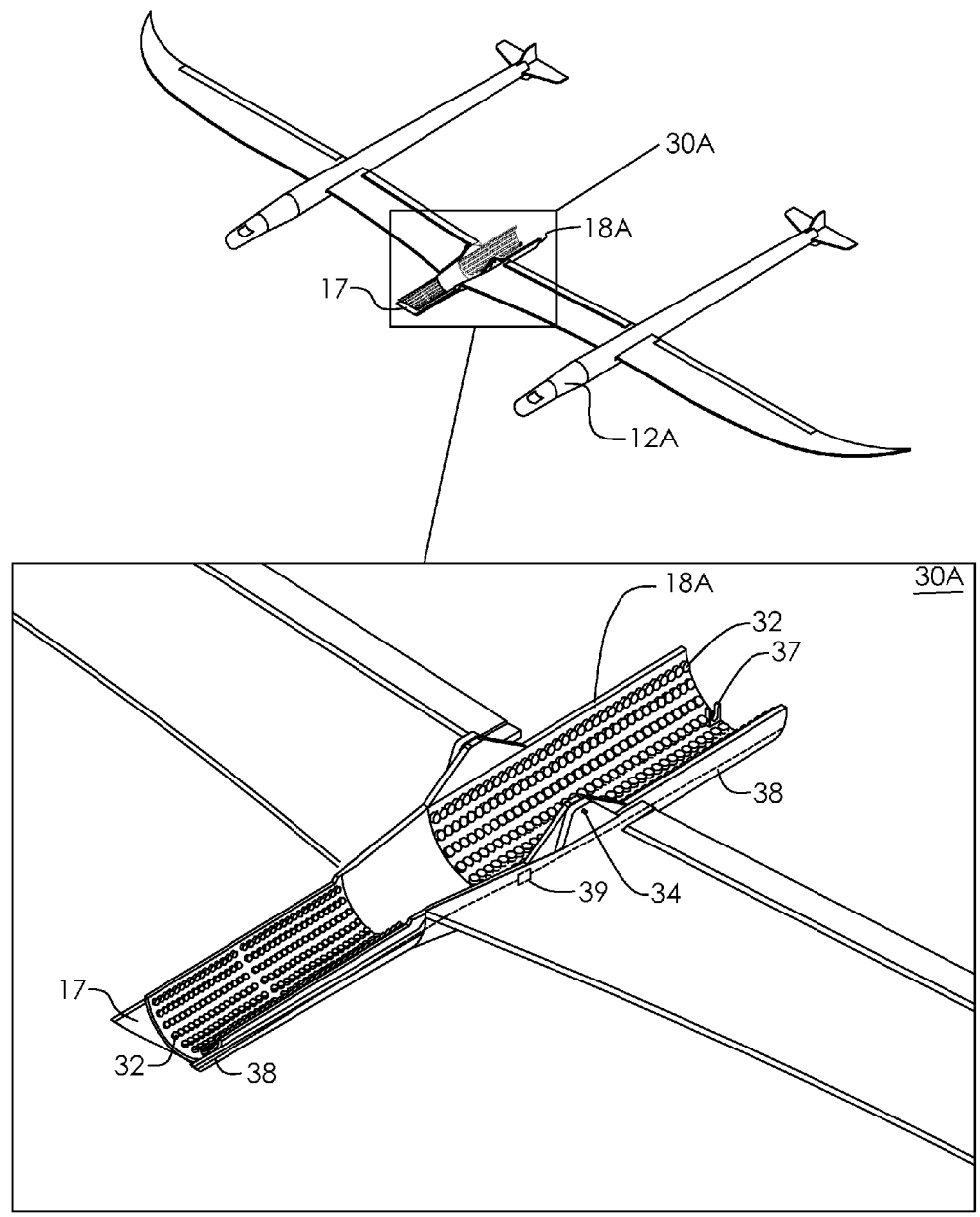
FIG. 6 is an isometric view of towed launch aircraft 12A of FIGS. 5A-5B showing details of tilting cradle 18A.

Referring now to FIGS. 5A-5B, an alternative towed launch aircraft 12A is shown, which is capable of performing a modified maneuver as described in the above-incorporated U.S. Patent Application. Towed launch aircraft 12A is similar to towed launch aircraft 12 described above, so only differences between them will be described below. Towed launch aircraft 12A has a tilting cradle 18A that increases the angle of booster rocket 10 with respect to horizontal, which is an alternative to increasing the flight path angle of towed launch aircraft 12 to a desired 50 degree launch angle. Cradle 18A rests in a central fuselage 17 of towed launch aircraft 12A until rotated, generally by a hydraulic lifter that contracts to pull the back edge of cradle 18A toward the wing of towed launch aircraft. FIG. 6 shows details of cradle 18A, which rotates with respect to fuselage 17 via a hinge 34 that extends from the wing of towed launch aircraft 12 and cradle 18A. Callout 30A shows a further detailed view.

Referring now to FIGS. 7A-7B, details of longitudinal support 37 mounted within, or alternatively at, the aft end of cradle 18. A longitudinal restraint 36 is provided on the exterior of booster rocket 10 and includes a roller that slides within the gap defined in longitudinal support 37 so that the aft end of booster rocket 10 is permitted to move vertically and laterally to float booster rocket 10 rocket in cradle, but does not permit booster rocket 10 to move longitudinally.

While a single longitudinal support 37 and longitudinal restraint 36 are shown, other schemes are possible, including another providing longitudinal support 37 and longitudinal restraint 36 at the fore end of cradle 18, alone or in combination with the longitudinal support 37 and longitudinal restraint 36 at aft end of booster rocket 10 and cradle 18.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A system for carrying a booster rocket, comprising: a launch aircraft for transporting the booster rocket to an elevation above a body; and a cradle affixed to atop the launch aircraft for carrying the booster rocket, wherein the cradle includes a compressible layer to distribute pressure applied by the cradle to surfaces of the booster rocket by contacting the booster rocket along most of the length of booster rocket to support a weight of the booster rocket atop the launch aircraft, wherein the compressible layer includes a plurality of gas or liquid-filled flexible chambers.

2. The system of claim 1, wherein the plurality of gas or liquid-filled chambers are in communication with each other to equalize their internal pressure.

3. The system of claim 2, further comprising a manifold for interconnecting the plurality of gas or liquid-filled chambers.

4. The system of claim 3, further comprising a pressure control system for adjusting an internal pressure of the plurality of gas or liquid-filled chambers during flight in conformity with an elevation of the launch aircraft.

5. The system of claim 1, wherein the plurality of gas or liquid-filled chambers comprise a plurality of balloons having a substantially circular cross-section and which are disposed in rows and columns across a surface area of the cradle that contacts the booster rocket.

6. The system of claim 1, wherein the plurality of gas or liquid-filled chambers comprise a plurality of cylinders.

7. The system of claim 6, wherein the cylinders extend along the cradle in a direction parallel to a fuselage of the launch aircraft.

8. The system of claim 1, wherein the launch aircraft is a powered aircraft for transporting the booster rocket to the elevation.

9. The system of claim 1, wherein the launch aircraft is a glider for transporting the booster rocket to the elevation under tow by another aircraft.

10. The system of claim 1, wherein the cradle is rotatable with respect to a fuselage of the launch aircraft to tilt the booster rocket upward prior to releasing the booster rocket.

11. A method of carrying a booster rocket, comprising:
transporting the booster rocket to an elevation above a body with a launch aircraft; and
supporting the booster rocket at the launch aircraft in a cradle including a compressible layer formed by a plurality of gas or liquid-filled flexible chambers that distribute pressure applied by the cradle to surfaces of the booster rocket by contacting the booster rocket along most of the length of the booster rocket to support a weight of the booster rocket atop the launch aircraft.

12. The method of claim 11, further comprising communicating gas or liquid between the chambers to equalize an internal pressure of the chambers.

13. The method of claim 12, further comprising adjusting an internal pressure of the plurality of gas or liquid-filled chambers during flight in conformity with an elevation of the launch aircraft.

14. The method of claim 11, wherein the plurality of gas or liquid-filled chambers comprise a plurality of balloons having a substantially circular cross-section and which are disposed in rows and columns across a surface area of the cradle that contacts the booster rocket.

15. The method of claim 11, wherein the plurality of gas or liquid-filled chambers comprise a plurality of cylinders.

16. The method of claim 11, further comprising tilting the cradle and the booster rocket upward prior to releasing the booster rocket.

17. The method of claim 11, wherein the launch aircraft is a glider, and wherein the method further comprises by another aircraft, towing the glider cradle to the elevation with the booster rocket secured in the cradle.

18. A system for carrying a booster rocket, comprising:
a launch aircraft for transporting the booster rocket to an elevation above a body; and
a cradle affixed to the launch aircraft for carrying the booster rocket, wherein the cradle includes a plurality of gas-filled chambers to distribute pressure applied by the cradle to surfaces of the booster rocket to support a weight of the booster rocket atop the launch aircraft by contacting the booster rocket along most of the length of booster rocket, wherein the plurality of gas-filled chambers are connected together in communication with each other by a manifold to equalize their internal pressure, and are further coupled to a pressure control system for adjusting an internal pressure of the plurality of gas or liquid-filled chambers during flight in conformity with an elevation of the launch aircraft.

* * * * *